(12) United States Patent
Chang et al.

(10) Patent No.: US 10,572,975 B2
(45) Date of Patent: Feb. 25, 2020

(54) METHOD FOR PROVIDING A USER INTERFACE TO STITCH SURVEILLANCE IMAGES OF A SCENE AND ELECTRONIC DEVICE THEREOF

(71) Applicant: VIVOTEK INC., New Taipei (TW)

(72) Inventors: Chia-Chi Chang, New Taipei (TW); Yi-Hsuen Shih, New Taipei (TW); Nian-Ci Lan, New Taipei (TW)

(73) Assignee: VIVOTEK INC., New Taipei (TW)

( * ) Notice: Subject to any disclaimer, the term of this patent is extended or adjusted under 35 U.S.C. 154(b) by 1 day.

(21) Appl. No.: 16/026,023

(22) Filed: Jul. 2, 2018

(65) Prior Publication Data

US 2019/0026862 A1 Jan. 24, 2019

(30) Foreign Application Priority Data

Jul. 18, 2017 (TW) .............................. 106124013 A (51) Int. Cl.
*H04N 5/222* (2006.01)
*G06T 3/40* (2006.01)
*G06K 9/00* (2006.01)
*G06T 5/50* (2006.01)
*G06F 3/0481* (2013.01)
*G06T 7/33* (2017.01)
*G06F 3/0484* (2013.01)

(52) U.S. Cl.
CPC ........ *G06T 3/4038* (2013.01); *G06F 3/04817* (2013.01); *G06K 9/00771* (2013.01); *G06T 5/50* (2013.01); *G06T 7/33* (2017.01); *G06F 3/04845* (2013.01); *G06T 2200/24* (2013.01); *G06T 2207/20221* (2013.01); *G06T 2207/30232* (2013.01)

(58) Field of Classification Search
CPC ............... H04N 7/181; H04N 5/23293; H04N 5/232933; G06T 7/33; G06T 7/80; G06T 2207/20092; G06T 2207/20212; G06T 2207/20221
See application file for complete search history.

(56) References Cited

U.S. PATENT DOCUMENTS 7,084,904 B2 * 8/2006 Liu .................. H04N 5/232
348/218.1
2007/0263076 A1 * 11/2007 Andrews ................ H04N 7/148
348/14.08

(Continued)

*Primary Examiner* — Kelly L Jerabek
(74) *Attorney, Agent, or Firm* — Winston Hsu (57) ABSTRACT

A method for providing a user interface to stitch surveillance images of a scene is applied to an electronic device and includes providing a master camera and a slave camera for monitoring two surveillance regions of the scene, providing an identical feature in an overlapped area between the two surveillance regions to make the identical feature present in a master image captured by the master camera for one surveillance region and a slave image captured by the slave camera for the other surveillance region, the electronic device displaying the user interface, and the electronic device stitching the master image and the slave image according to the identical feature when a stitching function is triggered. The user interface has a master image zone displaying the master image, a stitching zone displaying the slave image, and a stitched zone displaying a stitched image for the master and slave images.

18 Claims, 7 Drawing Sheets

(56) References Cited

U.S. PATENT DOCUMENTS

| | | | |
|---|---|---|---|
| 2008/0180550 A1* | 7/2008 | Gulliksson | H04N 5/232 348/231.99 |
| 2009/0040293 A1* | 2/2009 | Foo | G03B 37/04 348/36 |
| 2009/0051778 A1* | 2/2009 | Pan | H04N 5/232 348/218.1 |
| 2010/0097443 A1* | 4/2010 | Lablans | G03B 37/00 348/36 |
| 2015/0296141 A1* | 10/2015 | Zhang | G06T 3/4038 348/39 |
| 2015/0348580 A1* | 12/2015 | van Hoff | G11B 19/20 348/38 |
| 2016/0037082 A1* | 2/2016 | Wang | A61B 1/00009 348/65 |
| 2017/0230587 A1* | 8/2017 | Kanai | H04N 5/265 |
| 2018/0007245 A1* | 1/2018 | Rantala | G03B 37/04 |
| 2019/0260970 A1* | 8/2019 | Lu | B60R 1/00 |

* cited by examiner

METHOD FOR PROVIDING A USER INTERFACE TO STITCH SURVEILLANCE IMAGES OF A SCENE AND ELECTRONIC DEVICE THEREOF

BACKGROUND OF THE INVENTION

1. Field of the Invention

The present invention relates to a method for stitching surveillance images and an electronic device thereof, and more specifically, to a method for providing a user interface to stitch surveillance images of a scene and an electronic device thereof.

2. Description of the Prior Art

In general, safety monitoring on a specific scene (e.g. a main entrance of a department store) is usually performed by utilizing plural cameras to monitor this specific scene and then stitching captured images to a stitched image with a wide angle field-of-view for a panoramic view. However, since a conventional image stitching method involves manually selecting an identical feature in two adjacent surveillance images, it causes a time-consuming and strenuous stitching process and leads to stitching failure or poor stitching quality easily due to wrong manual operation. Furthermore, since the image stitching sequence and the device status of each camera is not optimized in the aforesaid image stitching method, it may cause a user much inconvenience in controlling and adjusting the related stitching progress.

SUMMARY OF THE INVENTION

The present invention provides a method for providing a user interface to stitch surveillance images of a scene. The method is applied to an electronic device and includes providing a master camera and at least one slave camera for monitoring at least two surveillance regions of the scene. Each surveillance region is partially overlapped with the adjacent surveillance region. The method further includes providing at least one identical feature in an overlapped area between each surveillance region and the adjacent surveillance region to make the at least one identical feature present in a master image captured by the master camera for one surveillance region and at least one slave image captured by the slave camera for the other surveillance region and the electronic device displaying the user interface. The user interface has a master image zone, a stitching zone, and a stitched zone. The master image zone displays the master image. The stitching zone displays a slave image to be stitched. The stitched zone displays a stitched image corresponding to the scene. The method further includes the electronic device stitching the master image and the at least one slave image according to the at least one identical feature when a stitching function is triggered.

The present invention further provides an electronic device for stitching surveillance images of a scene. A master camera and at least one slave camera monitors at least two surveillance regions of the scene. Each surveillance region is partially overlapped with the adjacent surveillance region and has at least one identical feature in an overlapped area between each surveillance region and the adjacent surveillance region to make the at least one identical feature present in a master image captured by the master camera for one surveillance region and at least one slave image captured by the slave camera for the other surveillance region. The electronic device includes a displaying unit and an image stitching unit. The displaying unit displays a user interface. The user interface has a master image zone, a stitching zone, and a stitched zone. The master image zone displays the master image. The stitching zone displays a slave image to be stitched. The stitched zone displays a stitched image corresponding to the scene. The image stitching unit is coupled to the displaying unit for stitching the master image and the at least one slave image according to the at least one identical feature when a stitching function is triggered.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
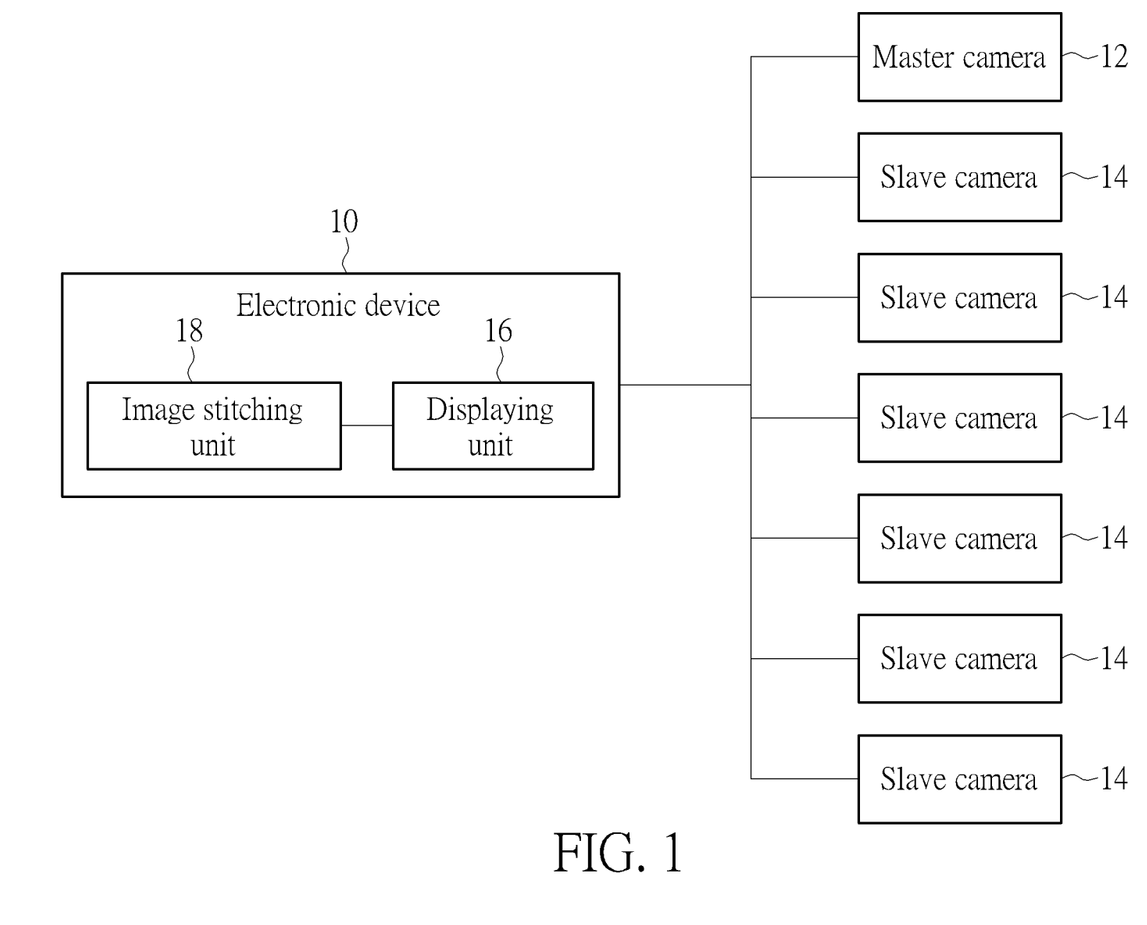
FIG. 1 is a functional block diagram of an electronic device according to an embodiment of the present invention.

Please refer to FIG. 1, which is a functional block diagram of an electronic device 10 according to an embodiment of the present invention. As shown in FIG. 1, the electronic device 10 is used for stitching images captured by a master camera 12 and at least one slave camera 14 (six shown in FIG. 1, but not limited thereto) for at least two surveillance regions (seven surveillance regions monitored by the master camera 12 and six slave cameras in a one-on-one manner, but not limited thereto) of a scene (e.g. a main entrance of a department store). The electronic device 10 is connected to the master camera 12 and the slave cameras 14 in a wired or wireless connection manner. Each surveillance region and the adjacent surveillance region are overlapped partially with each other and have an identical feature (e.g. an identical human contour feature generated by a user walking around within the two adjacent surveillance regions or an identical object feature), so as to make the identical feature present in a master image generated by the master camera 12 monitoring one of the surveillance regions and slave images generated by the slave cameras 14 monitoring other surveillance regions. As shown in FIG. 1, the electronic device 10 includes a displaying unit 16 and an image stitching unit 18 coupled to the displaying unit 16 to perform a surveillance image stitching method provided by the present invention. The displaying unit 16 is used for displaying a user interface, and the image stitching unit 18 is used for stitching the master image and the slave images.

Figure 2:
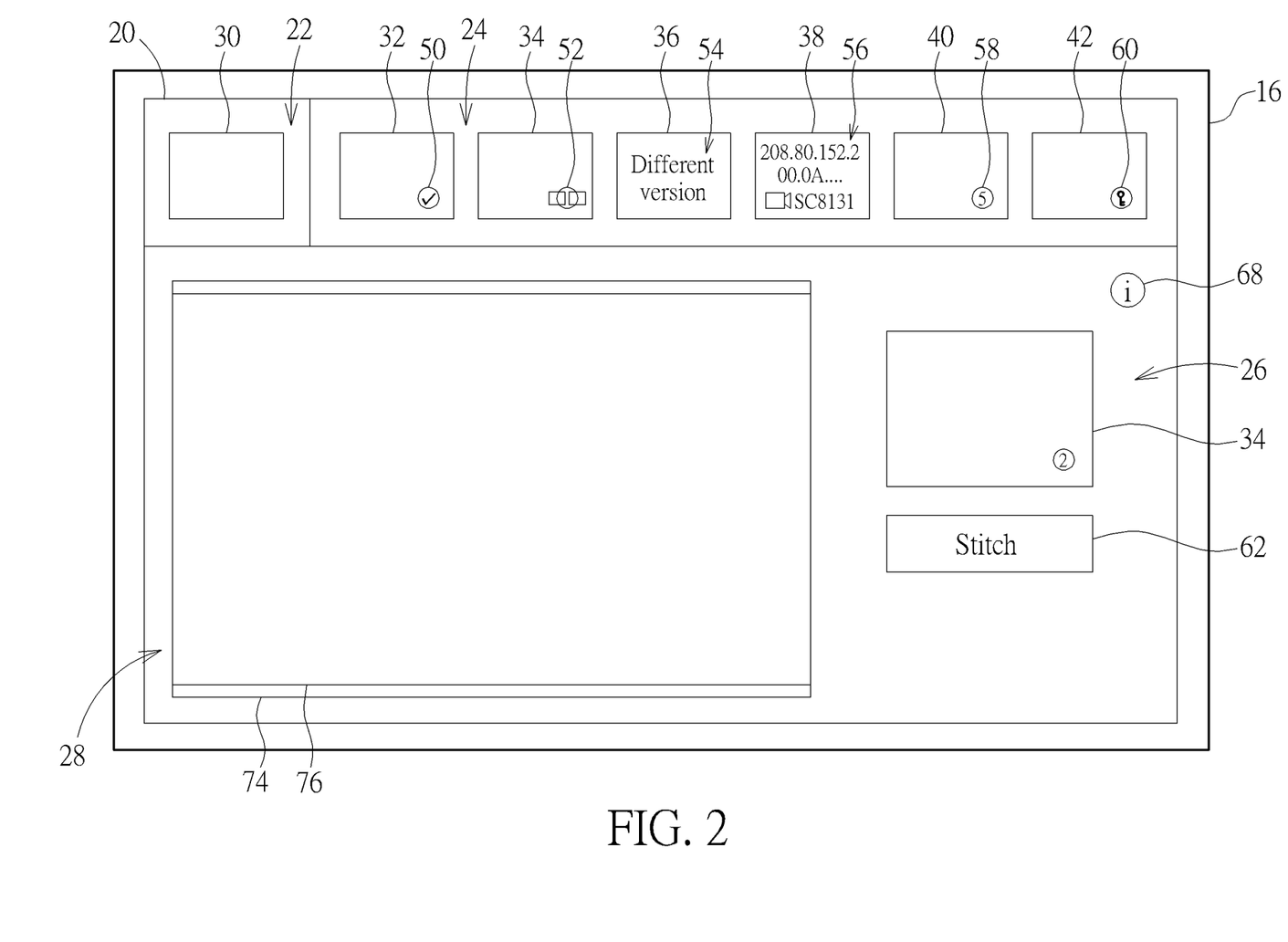
FIG. 2 is a diagram of a displaying unit in FIG. 1 displaying a user interface.
Figure 3:
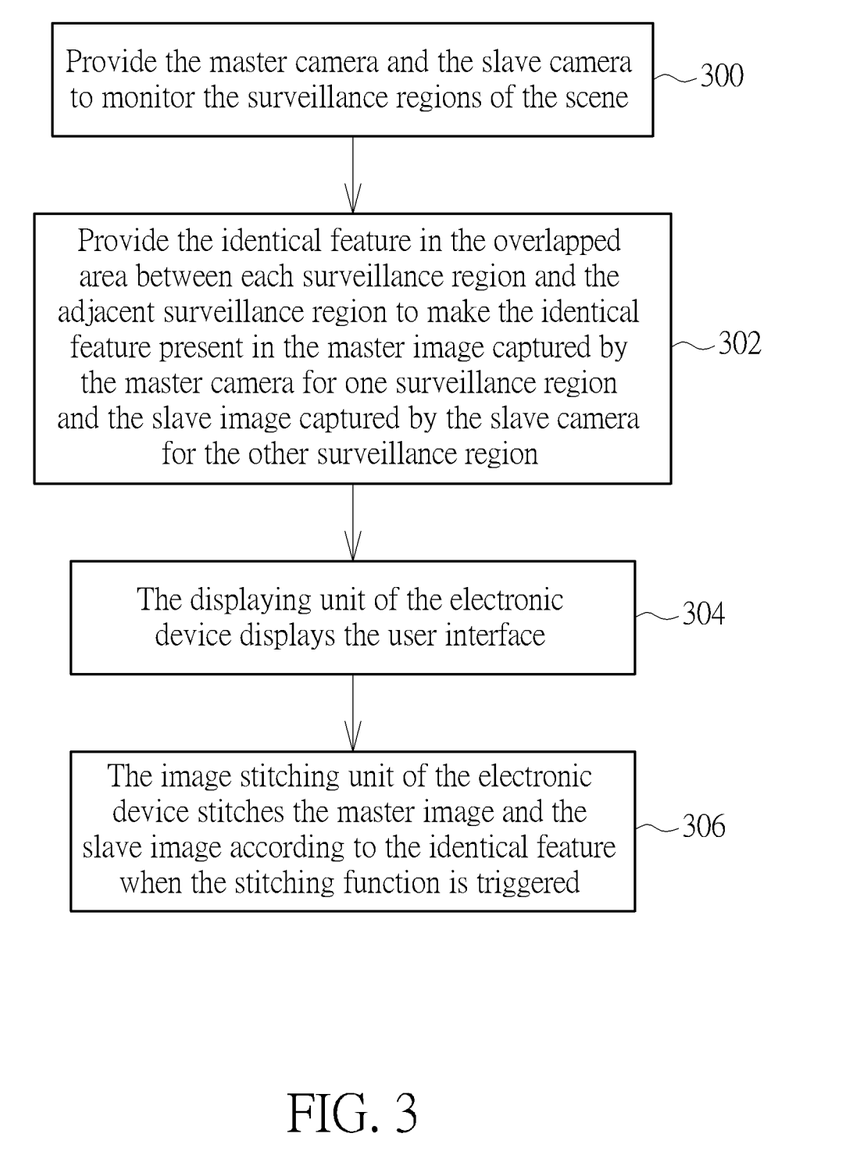
FIG. 3 is a flowchart of a surveillance image stitching method according to an embodiment of the present invention.

More detailed description for the surveillance image stitching method of the electronic device 10 is provided as follows. Please refer to FIG. 1, FIG. 2 and FIG. 3. FIG. 2 is a diagram of the displaying unit 16 in FIG. 1 displaying a user interface 20. FIG. 3 is a flowchart of a surveillance image stitching method according to an embodiment of the present invention. The surveillance image stitching method is performed via the user interface 20 provided by the present invention and includes the following steps.

Step 300: Provide the master camera 12 and the slave cameras 14 to monitor the surveillance regions of the scene.

Step 302: Provide the identical feature in the overlapped area between each surveillance region and the adjacent surveillance region to make the identical feature present in the master image captured by the master camera 12 for one surveillance region and the slave image captured by the slave camera 14 for the other surveillance region.

Step 304: The displaying unit 16 of the electronic device 10 displays the user interface 20.

Step 306: The image stitching unit 18 of the electronic device 10 stitches the master image and the slave image according to the identical image when a stitching function is triggered.

The aforesaid steps are described in detail in the embodiment that the present invention utilizes the master camera 12 and the six slave cameras 14 to monitor a scene (but not limited thereto, meaning that the mounting amount of slave cameras 14 could vary with the practical application of the present invention). First, in Step 300, the master camera 12 and the slave cameras 14 monitor the surveillance regions in the scene, meaning that the master camera 12 and the slave cameras 14 are mounted at corresponding positions aligned with their target surveillance regions respectively for generating surveillance images. For example, in this embodiment, the present invention could adopt the design that the master camera 12 and the six salve cameras 14 are aligned with seven surveillance regions at a main entrance of a department store sequentially from left to right, but not limited thereto. As for other derived embodiments for arrangement of the master camera 12 and the six slave cameras 14 (e.g. the master camera 12 and the slave cameras 14 are arranged from right to left, or the six slave cameras 14 are mounted at two sides of the master camera 12 respectively), the related description can be reasoned by analogy according to the following description and omitted herein. Subsequently, in Step 302, the identical feature could be provided in the overlapped area between each surveillance region and the adjacent surveillance region respectively to make the identical feature present in the master image captured by the master camera 12 for one surveillance region (e.g. the left-most surveillance region at the main entrance of the department store) and the slave image captured by the slave camera 14 for the other surveillance region. For example, the user could place an object in the overlapped area between each surveillance region and the adjacent surveillance region, or could walk around within the overlapped area, so as to make the object feature or the human contour feature present in the adjacent images for ensuring that the subsequent image stitching process could be performed successfully.

During the aforesaid process, the electronic device 10 could establish connection to the master camera 12 and the slave cameras 14 after mounting of the master camera 12 and the slave cameras 14 is completed, so as to read the related device statuses of the master camera 12 and the slave cameras 14 and receive the images captured by the master camera 12 and the slave cameras 14, and the electronic device 10 could display the user interface 20 accordingly (Step 304) for the user to perform the subsequent image stitching operations. As shown in FIG. 2, the user interface 20 could have a master image zone 22, a stitching sequence zone 24, a stitching zone 26, and a stitched zone 28. The master image zone 22 is used for displaying the master image 30 captured by the master camera 12. The stitching sequence zone 24 is used for sequentially displaying the slave images 32, 34, 36, 38, 40 and 42 captured by the six slave cameras 14. The stitching zone 26 is used for displaying the slave image to be currently stitched (e.g. the salve image 34 as shown in FIG. 2, but not limited thereto). The stitched zone 28 is used for displaying the stitched image corresponding to the scene.

Figure 4:
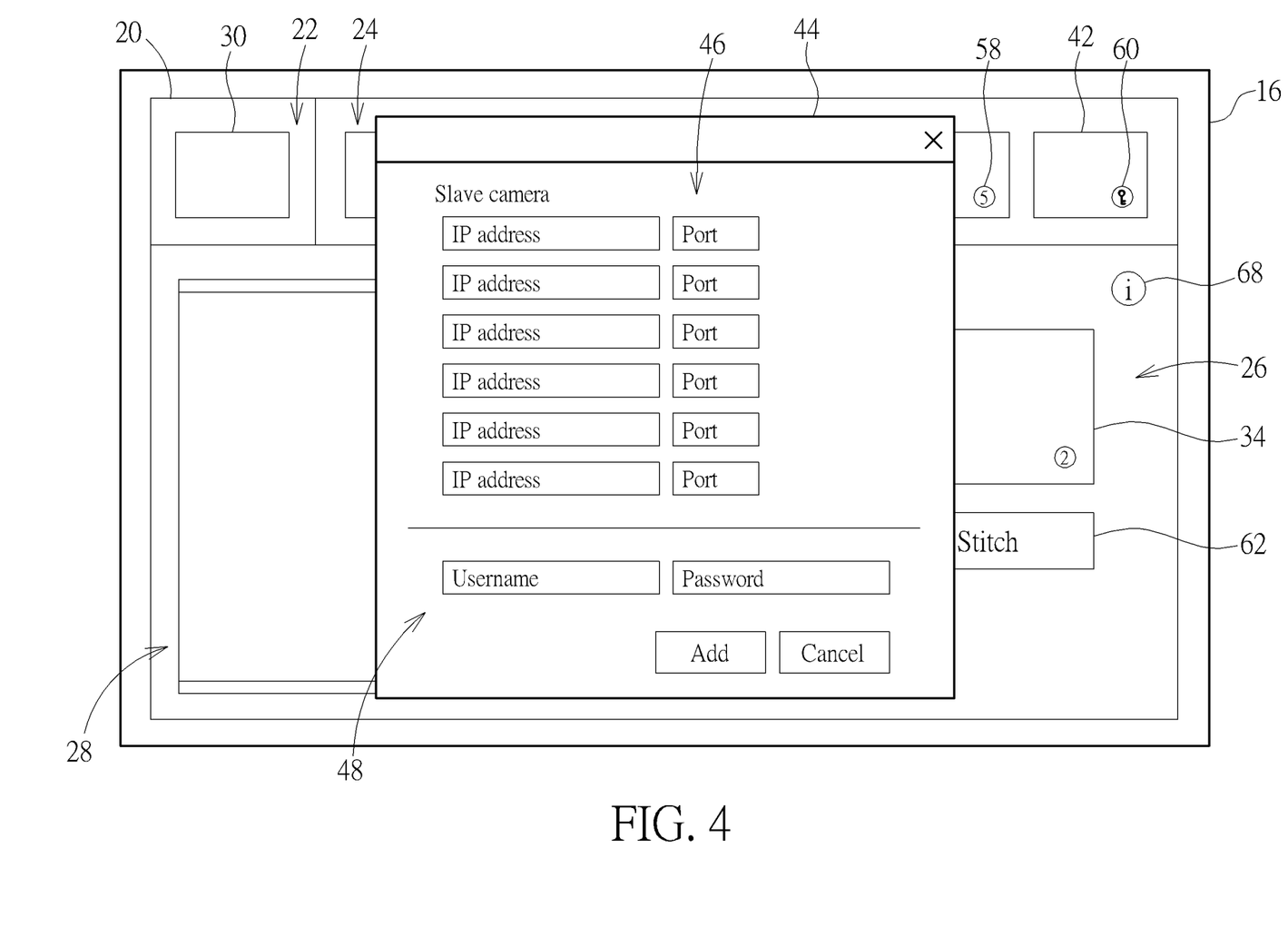
FIG. 4 is a diagram of the displaying unit in FIG. 2 displaying a camera register interface.

To be more specific, the arrangement sequence of the slave images 32, 34, 36, 38, 40 and 42 in the stitching sequence zone 24 could be set manually. For example, please refer to FIG. 4, which is a diagram of the displaying unit 16 in FIG. 2 displaying a camera register interface 44. As shown in FIG. 4, the camera register interface 44 could have an address information column 46 and a password column 48. After mounting of the master camera 12 and the slave cameras 14 is completed, the user could fill in the network address and the connection port of each slave camera 14 at the address information column 46, and could fill in the account password of each slave camera 14 at the password column 48 to get the access authority of each slave camera 14, so as to establish image transmission between the electronic device 10 and each slave camera 14. In such a manner, the image stitching unit 18 could determine the arrangement sequence of the six slave images 32, 34, 36, 38, 40 and 42 according to the register sequence of the six slave cameras 14 at the address information column 46, and the displaying unit 16 could display the slave images 32, 34, 36, 38, 40 and 42 sequentially in the stitching sequence zone 24 according to the aforesaid arrangement sequence (as shown in FIG. 2).

To be noted, if the register sequence of the slave cameras 14 does not conform to the actual mounting position information (e.g. the user does not set the address information of each slave camera 14 according to the actual mounting positions of the slave cameras 14) to cause stitching failure or poor stitching quality of the image stitching process, the user could directly modify the arrangement sequence of the slave images 32, 34, 36, 38, 40 and 42 in the stitching sequence zone 24 via the user interface 20 (e.g. by performing an image dragging operation on the user interface 20) according to the actual mounting position of each slave camera 14. As such, arrangement of the slave images 32, 34, 36, 38, 40 and 42 can conform to the actual location sequence of the slave cameras 14 (e.g. the six slave cameras 14 are arranged from left to right sequentially as mentioned above), to make the image stitching process faster and more precise. Furthermore, in another embodiment, the present invention could adopt the design that the arrangement sequence of the slave images 32, 34, 36, 38, 40 and 42 could be set automatically. For example, the image stitching unit 18 can automatically set arrangement of the slave images 32, 34, 36, 38, 40 and 42 in the stitching sequence zone 24 according to positioning information (e.g. GPS (Global Positioning System) information), so as to make arrangement of the slave images 32, 34, 36, 38, 40 and 42 surely conform to the actual location sequence of the slave cameras 14.

Furthermore, in practical application, for helping the user clearly know the individual status and the stitching sequence of each slave camera 14, the displaying unit 16 could display the status icon, which corresponds to the device status of each slave camera 14 read by the electronic device 10, on each slave image. For example, as shown in FIG. 2, the displaying unit 16 could display a status icon 50 on the slave image 32 to let the user know that stitching of the slave image 32 has been completed. The displaying unit 16 could further display a status icon 52 on the slave image 34 to let the user know the slave image 34 is the image to be currently stitched. The displaying unit 16 could further display a status icon 54 (by text) on the slave image 36 to let the user know the device version (e.g. firmware version) of the slave camera 14 corresponding to the slave image 36 is not compatible with the device version of the master camera 12 to cause disconnection between the slave camera 14 and the master camera 12. The displaying unit 16 could further display a status icon 56 (e.g. displaying the status icon 56 when the user moves a cursor on the slave image 38) on the slave image 38 to let the user know the related device information (e.g. network address, MAC (Media Access Control) address, or product serial number) of the slave camera 14 corresponding to the slave image 38. The displaying unit 16 could further display a status icon 58 on the slave image 40 to let the user know the stitching sequence of the slave image 40. The displaying unit 16 could further display a status icon 60 on the slave image 42 to let the user know the register information of the slave camera 14 corresponding to the slave image 42 is wrong (e.g. password is incorrect) to cause access failure of the slave image 42. As for the other derived designs for displaying other status icon corresponding to the slave camera 14 on the slave image (e.g. displaying the status icon indicating a malfunction of the slave camera on the slave image), the related description could be reasoned by analogy according to the aforesaid description and omitted herein.

Finally, in Step 306, when the stitching function is triggered, the image stitching unit 18 stitches the master image 30 and the slave images 32, 34, 36, 38, 40 and 42 according to the identical feature. For example, the stitching zone 26 could have a stitch icon 62 showed therein, and the displaying unit 16 could display the stitch icon 62 in the stitching zone 26 before the image stitching process is performed. Accordingly, the image stitching unit 18 can execute the stitching function when the stitch icon 62 is selected, so as to perform stitching of the slave image currently located in the stitching zone 26 (e.g. the slave image 34 as shown in FIG. 2).

Figure 5:
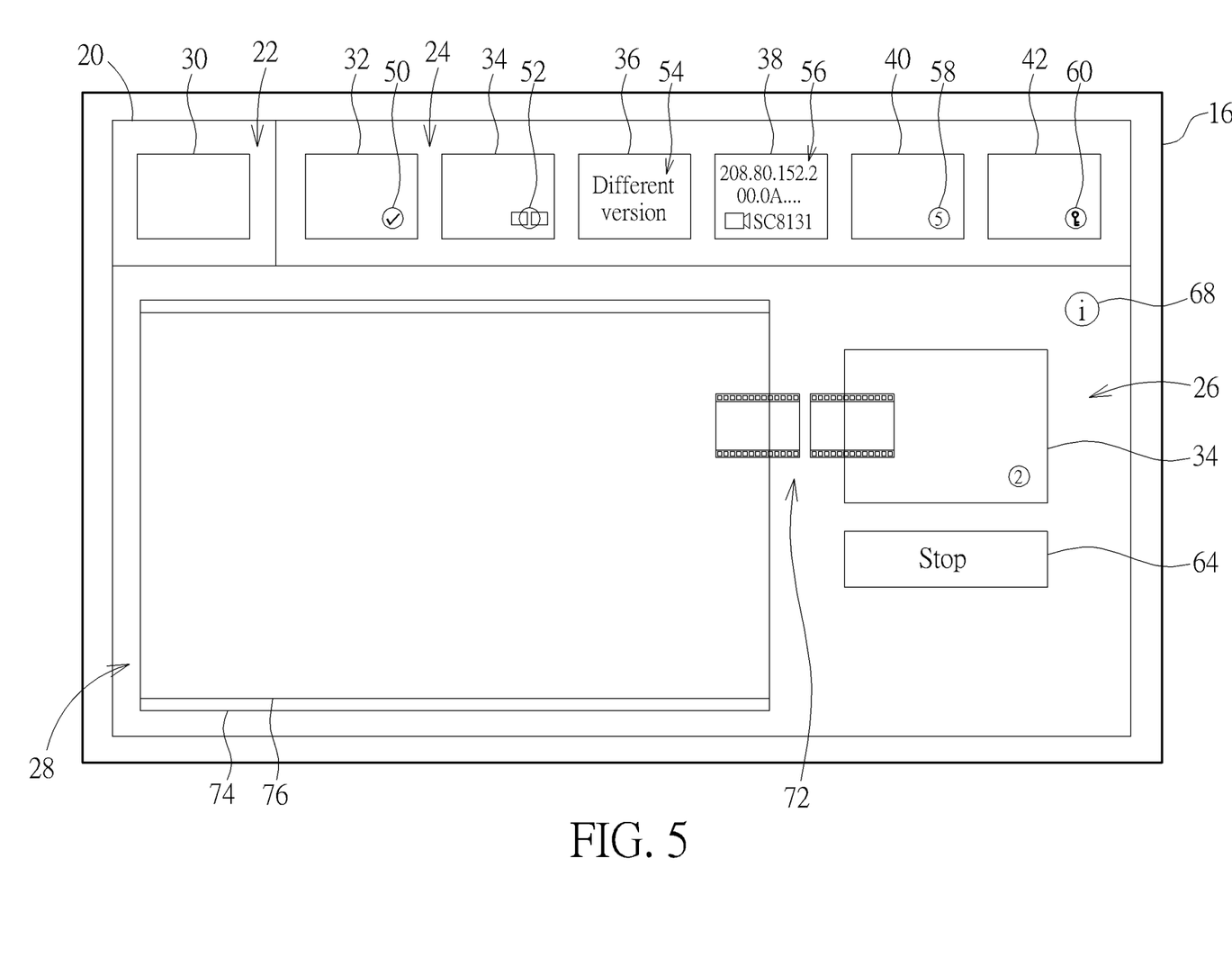
FIG. 5 is a diagram of the displaying unit in FIG. 2 displaying a stop icon in a stitching zone during an image stitching process.
Figure 6:
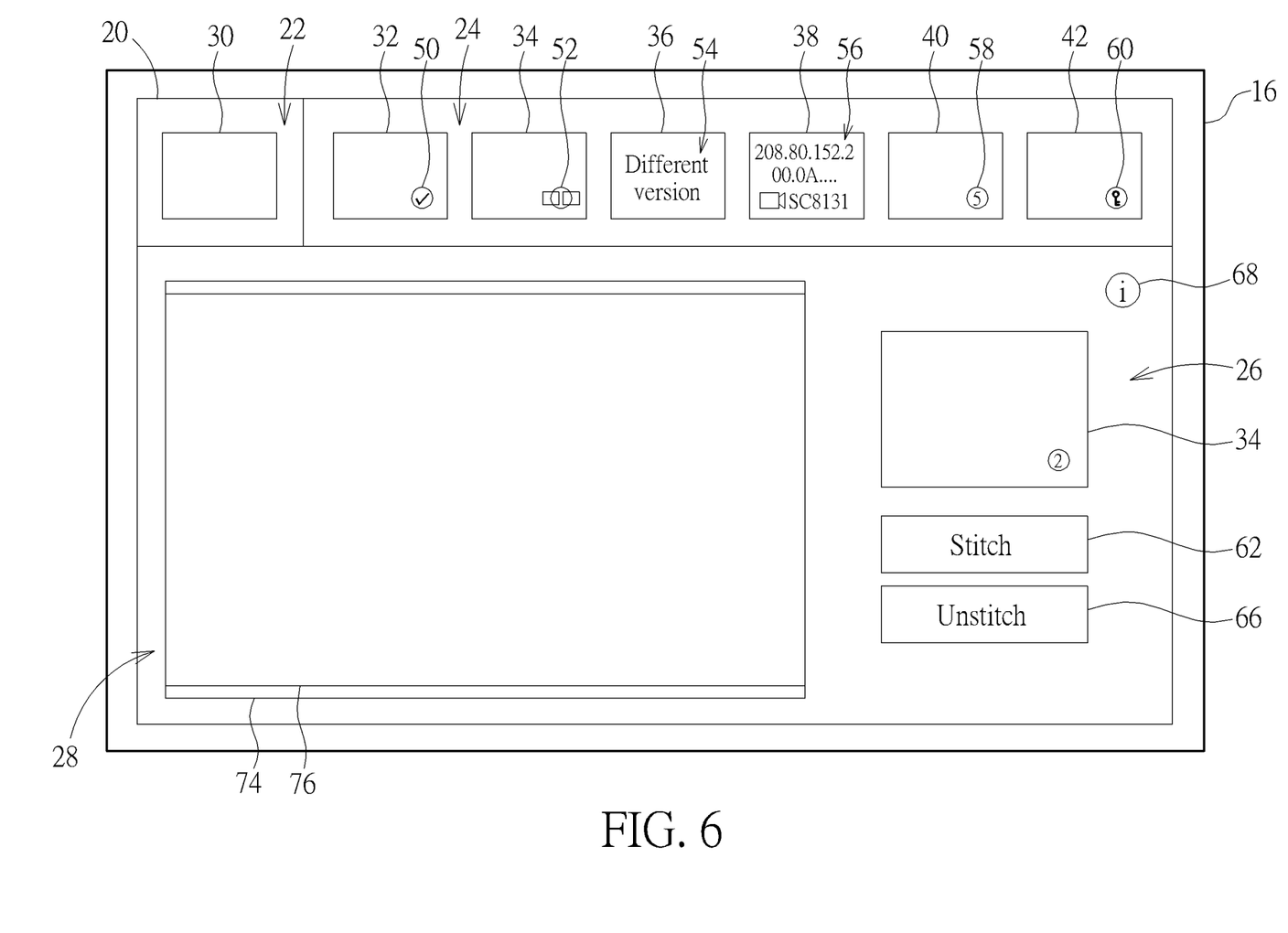
FIG. 6 is a diagram of the displaying unit in FIG. 5 displaying a stitch icon and an unstitch icon in the stitching zone when the stop icon is selected.
Figure 7:
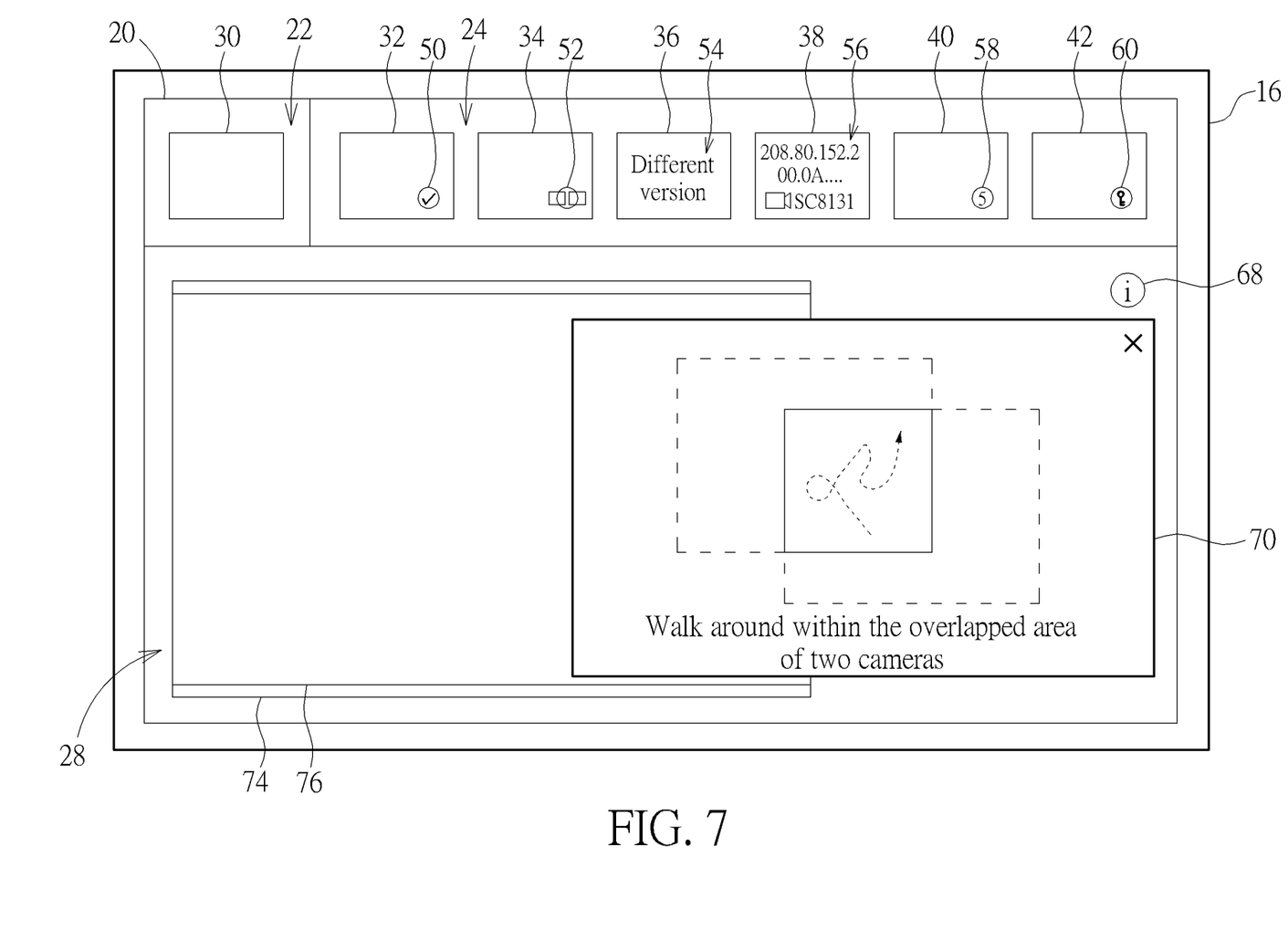
FIG. 7 is a diagram of the displaying unit in FIG. 2 displaying a feature teaching prompt when a prompt icon in the stitching zone is selected.

Furthermore, the electronic device 10 could further provide a stop function and an unstitch function, and the related design is as shown in FIG. 5, FIG. 6, and FIG. 7. FIG. 5 is a diagram of the displaying unit 16 in FIG. 2 displaying a stop icon 64 in the stitching zone 26 during the image stitching process. FIG. 6 is a diagram of the displaying unit 16 in FIG. 5 displaying the stitch icon 62 and an unstitch icon 66 in the stitching zone 26 when the stop icon 64 is selected. FIG. 7 is a diagram of the displaying unit 16 in FIG. 2 displaying a feature teaching prompt 70 when a prompt icon 68 in the stitching zone 26 is selected. During the aforesaid process, as shown in FIG. 5, the stitching zone 26 could further have the stop icon 64 showed therein, and the displaying unit 16 could display the stop icon 64 in the stitching zone 26 during the image stitching process. Accordingly, the image stitching unit 18 stops stitching of the slave image 34 currently located at the stitching zone 26 when the stop icon 64 is selected. Furthermore, in practical application, the displaying unit 16 could display a dynamic prompt 72 (as shown in FIG. 5) between the stitching zone 26 and the stitched zone 28 during the image stitching process, to help the user know the image stitching process is now performed.

On the other hand, as shown in FIG. 6, the displaying unit 16 could display the stitch icon 62 and the unstitch icon 66 in the stitching zone 26 when the stop icon 64 is selected. Accordingly, the stitching unit 18 could continue to perform stitching of the slave image 34 currently located at the stitching zone 26 when the stitch icon 62 is selected, or could cancel stitching of the slave image 34 when the unstitch icon 66 is selected. To be noted, as shown in FIG. 7, in this embodiment, the stitching zone 26 could further have the feature teaching icon 68 showed therein, and the displaying unit 16 could display the feature teaching prompt 70 when the feature teaching icon 68 is selected, so as to remind the user of providing the identical feature in the overlapped area between each surveillance region and the adjacent surveillance region when the image stitching quality is poor or the image stitching process fails. Moreover, the displaying unit 16 could automatically display the feature teaching prompt 70 to teach the user how to provide the identical feature when the user operates the user interface 20 at the first time.

After the image stitching unit 18 has completed the aforesaid image stitching process sequentially for the master image 30 and the slave images 32, 34, 36, 38, 40 and 42, the displaying unit 16 could display the stitched image corresponding to the scene (the field-of-view of the stitched image could vary with the practical surveillance needs of the electronic device 10, such as 360° for a panoramic view) in the stitched zone 28, so as to achieve the wide-angle surveillance purpose. In practical application, the displaying unit 16 could properly adjust the display size of the stitched image. For example, as shown in FIG. 2, the stitched zone 28 could have a stitched image frame 74 (preferably in a rectangle shape as shown in FIG. 2, but not limited thereto, meaning that the present invention could adopt other frame design in another embodiment, such as a square or circular frame). After the image stitching unit 18 has completed the image stitching process for the master image 30 and the slave images 32 to generate a stitched image 76, the displaying unit 16 could adjust the display size of the stitched image 76 to conform to the size of the stitched image frame 74 for the user to view conveniently. Furthermore, in this embodiment, the displaying unit 16 could adjust the display status of the stitched image frame 74 (e.g. flashing the stitched image frame 74) to generate a completion prompt for reminding the user that the electronic device 10 has completed the image stitching process.

It should be mentioned that the stitching sequence zone could be omitted. That is to say, in the embodiment that the master image provided by the master camera is only stitched with the slave image provided by one single slave camera, the present invention could omit the design that the slave images captured by the plurality of slave cameras are arranged sequentially in the stitching sequence zone for simplifying the user interface.

In summary, the present invention adopts the design that the image stitching process for the scene is performed via the user interface according to the identical feature in the images captured by the master camera and the slave cameras, to efficiently solve the prior art problem that a conventional image stitching process is time-consuming and strenuous since it needs to be performed manually and wrong manual operation may easily lead to stitching failure or poor stitching quality. Furthermore, via the graphical interface design, the user can clearly know the stitching sequence and the individual status of each camera. In such a manner, the present invention can greatly improve operational convenience of the camera in controlling and adjusting the related stitching progress.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for providing a user interface to stitch surveillance images of a scene being applied to an electronic device, the method comprising:

providing a master camera and at least one slave camera for monitoring at least two surveillance regions of the scene, each surveillance region being partially overlapped with the adjacent surveillance region;

providing at least one identical feature in an overlapped area between each surveillance region and the adjacent surveillance region to make the at least one identical feature present in a master image captured by the master camera for one surveillance region and at least one slave image captured by the slave camera for the other surveillance region;

the electronic device displaying the user interface, the user interface having a master image zone, a stitching zone, and a stitched zone, the master image zone displaying the master image, the stitching zone displaying a slave image to be stitched, the stitched zone displaying a stitched image corresponding to the scene, the stitching zone having a stitch icon and a stop icon, the electronic device displaying the stitch icon in the stitching zone before the stitching function is triggered, the electronic device performing the stitching function on the slave image currently located in the stitching zone when the stitch icon is selected, the electronic device displaying the stop icon in the stitching zone when the electronic device performs the stitching function, and the electronic device stopping performing the stitching function on the slave image in the stitching zone when the stop icon is selected; and the electronic device stitching the master image and the at least one slave image according to the at least one identical feature when a stitching function is triggered.

2. The method of claim 1, wherein the electronic device displays a dynamic prompt between the stitching zone and the stitched zone when the electronic device stitches the master image and the at least one slave image.

3. The method of claim 1, wherein the stitched zone has a stitched image frame, and the electronic device adjusts a display size of the stitched image to conform to a size of the stitched image frame.

4. The method of claim 3, wherein the electronic device adjusts a display status of the stitched image frame to generate a completion prompt.

5. The method of claim 1, wherein the electronic device displays a status icon corresponding to a device status of the at least one slave camera read by the electronic device on each slave image.

6. The method of claim 1, wherein the user interface further has a stitching sequence zone, and the at least one slave image is arranged sequentially in the stitching sequence zone.

7. The method of claim 6, wherein the electronic device determines an arrangement sequence of the at least one slave image in the stitching sequence zone according to an actual mounting position of each slave camera.

8. The method of claim 1, wherein the stitching zone further has an unstitch icon displayed therein; the electronic device displays the stitch icon and the unstitch icon in the stitching zone when the stop icon is selected; the electronic device cancels stitching of the slave camera currently performed in the stitching zone when the unstitch icon is selected.

9. The method of claim 1, wherein the stitching zone further has a feature teaching icon, and the electronic device displays a feature teaching prompt on the user interface when the feature teaching icon is selected.

10. An electronic device for stitching surveillance images of a scene, a master camera and at least one slave camera monitoring at least two surveillance regions of the scene, each surveillance region being partially overlapped with the adjacent surveillance region and having at least one identical feature in an overlapped area between each surveillance region and the adjacent surveillance region to make the at least one identical feature present in a master image captured by the master camera for one surveillance region and at least one slave image captured by the slave camera for the other surveillance region, the electronic device comprising:

a displaying unit displaying a user interface, the user interface having a master image zone, a stitching zone, and a stitched zone, the master image zone displaying the master image, the stitching zone displaying a slave image to be stitched, the stitched zone displaying a stitched image corresponding to the scene, the stitching zone having a stitch icon and a stop icon, the displaying unit displaying the stitch icon in the stitching zone before a stitching function is triggered; and an image stitching unit coupled to the displaying unit for stitching the master image and the at least one slave image according to the at least one identical feature when the stitching function is triggered, the image stitching unit performing the stitching function on the slave image currently located in the stitching zone when the stitch icon is selected, the displaying unit displaying the stop icon in the stitching zone when the image stitching unit performs the stitching function, and the image stitching unit stopping performing the stitching function on the slave image in the stitching zone when the stop icon is selected.

11. The electronic device of claim 10, wherein the displaying unit displays a dynamic prompt between the stitching zone and the stitched zone when the image stitching unit stitches the master image and the at least one slave image.

12. The electronic device of claim 10, wherein the stitched zone has a stitched image frame, and the displaying unit adjusts a display size of the stitched image to conform to a size of the stitched image frame.

13. The electronic device of claim 12, wherein the displaying unit adjusts a display status of the stitched image frame to generate a completion prompt.

14. The electronic device of claim 10, wherein the displaying unit displays a status icon corresponding to a device status of the at least one slave camera read by the electronic device on each slave image.

15. The electronic device of claim 10, wherein the user interface further has a stitching sequence zone, and the at least one slave image is arranged sequentially in the stitching sequence zone.

16. The electronic device of claim 15, wherein an arrangement sequence of the at least one slave image in the stitching sequence zone is determined according to an actual mounting position of each slave camera.

17. The electronic device of claim 10, wherein the stitching zone further has an unstitch icon displayed therein; the displaying unit displays the stitch icon and the unstitch icon in the stitching zone when the stop icon is selected; the image stitching unit cancels stitching of the slave camera currently performed in the stitching zone when the unstitch icon is selected.

18. The electronic device of claim 10, wherein the stitching zone further has a feature teaching icon, and the displaying unit displays a feature teaching prompt on the user interface when the feature teaching icon is selected.

* * * * *